US012259117B2

(12) United States Patent
Chen et al.

(10) Patent No.: US 12,259,117 B2
(45) Date of Patent: Mar. 25, 2025

(54) LAMP

(71) Applicants: SUZHOU OPPLE LIGHTING CO., LTD., Suzhou (CN); OPPLE LIGHTING CO., LTD., Shanghai (CN)

(72) Inventors: Zhongya Chen, Suzhou (CN); Xingchen Tan, Suzhou (CN)

(73) Assignees: Suzhou Opple Lighting Co., Ltd., Suzhou (CN); Opple Lighting Co., Ltd., Shanghai (CN)

( * ) Notice: Subject to any disclaimer, the term of this patent is extended or adjusted under 35 U.S.C. 154(b) by 0 days.

(21) Appl. No.: 18/744,101

(22) Filed: Jun. 14, 2024

(65) Prior Publication Data

US 2024/0337374 A1 Oct. 10, 2024

Related U.S. Application Data

(63) Continuation of application No. PCT/CN2022/137984, filed on Dec. 9, 2022.

(51) Int. Cl.
*F21V 29/00* (2015.01)
*F21V 29/70* (2015.01)

(52) U.S. Cl.
CPC .................................... *F21V 29/70* (2015.01)

(58) Field of Classification Search
CPC ....................................................... F21V 29/70
See application file for complete search history.

(56) References Cited

U.S. PATENT DOCUMENTS

| | | | | |
|---|---|---|---|---|
| 10,788,181 B1 * | 9/2020 | Gao | ........................ | F21S 45/48 |
| 2010/0226137 A1 * | 9/2010 | Xiao | ....................... | F21V 29/89 362/373 |
| 2010/0301724 A1 * | 12/2010 | Chu | ...................... | F21V 29/773 313/45 |

(Continued)

FOREIGN PATENT DOCUMENTS

| | | |
|---|---|---|
| CN | 103629646 A | 3/2014 |
| CN | 105546456 A | 5/2016 |

(Continued)

OTHER PUBLICATIONS

International Search Report of PCT/CN2022/137984 dated Mar. 7, 2023 with English translation.

*Primary Examiner* — Gerald J Sufleta, II
(74) *Attorney, Agent, or Firm* — Arch & Lake LLP

(57) ABSTRACT

The present disclosure provides a lamp, which includes a lamp body and a light source assembly arranged in the lamp body. The lamp further includes a heat dissipation structure and a fastener which are located between the lamp body and the light source assembly, wherein the lamp body is provided with at least one perforation, and one side of the heat dissipation structure facing towards the lamp body is provided with a blind hole corresponding to the perforation, and the fastener passes through the perforation to be connected with the blind hole to reduce the gap between the heat dissipation structure and the lamp body; one side of the heat dissipation structure facing towards the light source assembly is provided with a connecting part, and the connecting part is connected with the light source assembly to reduce the gap between the light source assembly and the heat dissipation structure.

10 Claims, 5 Drawing Sheets

(56) References Cited

U.S. PATENT DOCUMENTS

| | | | | |
|---|---|---|---|---|
| 2011/0317412 | A1* | 12/2011 | Paik | F21V 13/04 362/249.02 |
| 2013/0335982 | A1* | 12/2013 | Wu | F21V 29/83 362/382 |
| 2014/0153277 | A1* | 6/2014 | Lai | F21K 9/69 362/558 |
| 2015/0323169 | A1* | 11/2015 | Kuriyama | F21V 19/002 362/294 |
| 2017/0205064 | A1* | 7/2017 | Liao | F21K 9/233 |
| 2018/0299093 | A1* | 10/2018 | Lai | F21S 41/192 |
| 2021/0156556 | A1* | 5/2021 | Choi | F21K 9/233 |
| 2021/0199275 | A1* | 7/2021 | Lin | F21V 29/508 |
| 2022/0136690 | A1* | 5/2022 | Zeng | F21V 17/18 362/294 |
| 2023/0071049 | A1* | 3/2023 | Wang | F21V 29/773 |
| 2023/0130607 | A1* | 4/2023 | Li | F21V 23/06 362/249.06 |

FOREIGN PATENT DOCUMENTS

| | | | |
|---|---|---|---|
| CN | 211780294 | U | 10/2020 |
| CN | 216667616 | U | 6/2022 |
| JP | 2004063830 | A | 2/2004 |

* cited by examiner

LAMP

CROSS-REFERENCE TO RELATED APPLICATION

This application is based upon and claims the priority of PCT patent application No. PCT/CN2022/137984 filed on Dec. 9, 2022 which claims priority to the Chinese patent application No. 202123130705. X filed on Dec. 14, 2021, the entire contents of which are hereby incorporated by reference herein for all purposes.

TECHNICAL FIELD

The present disclosure relates to a lamp, belonging to the technical field of lighting.

BACKGROUND

The design for heat dissipation of lamps is generally realized by reducing a heat conduction path or reducing a thermal resistance, which is sometimes implemented by filling a thermally conductive plastic part.

SUMMARY

The present disclosure provides a lamp.

The present disclosure provides a lamp that may include a lamp body and a light source assembly arranged in the lamp body. The lamp may further include a heat dissipation structure and a fastener which are located between the lamp body and the light source assembly; the lamp body is provided with at least one perforation, and one side of the heat dissipation structure facing towards the lamp body is provided with a blind hole corresponding to the perforation; the fastener is configured to pass through the perforation to be connected with the blind hole so as to reduce a gap between the heat dissipation structure and the lamp body; one side of the heat dissipation structure facing towards the light source assembly is provided with a connecting part, and the connecting part is connected with the light source assembly to reduce a gap between the light source assembly and the heat dissipation structure.

It is to be understood that both the foregoing general description and the following detailed description are exemplary and explanatory only and are not restrictive of the present disclosure.

DETAILED DESCRIPTION

Figure 1:
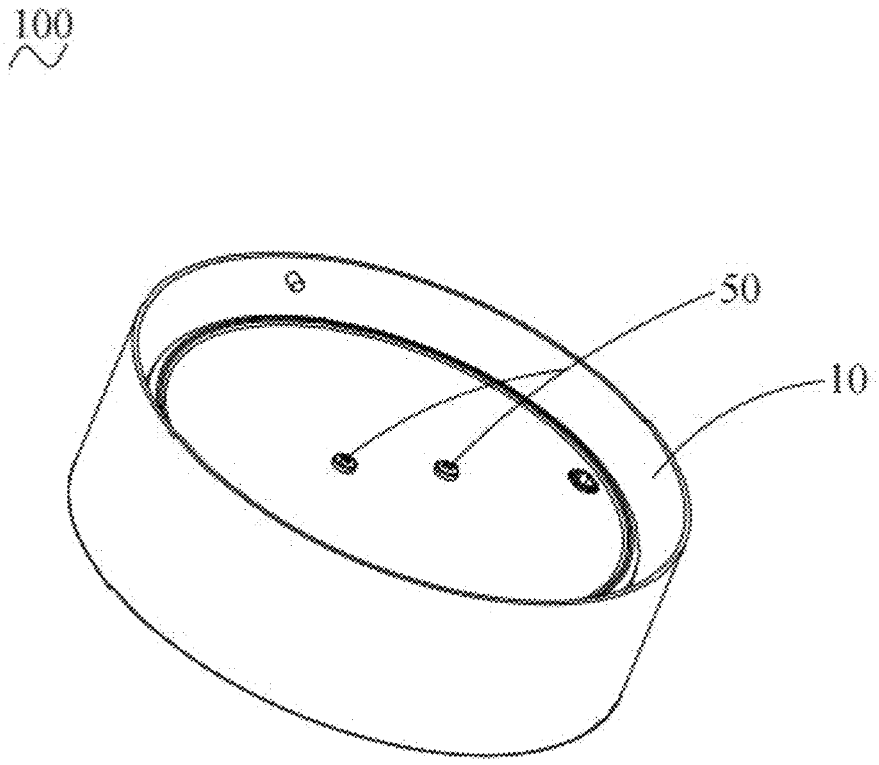
FIG. 1 is a schematic structural diagram of a lamp of the present disclosure.

In order to make the objective, technical solution and advantages of the present disclosure more apparent, the present disclosure will be described in details in connection with accompanying drawings and examples.

Here, it should be noted that in order to avoid obscuring the present disclosure with unnecessary details, only the structures and/or processing steps closely related to the solution of the present disclosure are shown in the accompanying drawings, while other details that are not much related to the present disclosure have been omitted.

In addition, it should be noted that the terms "comprising", "including" or any other variations thereof are intended to cover non-exclusive inclusion, so that a process, method, article or equipment including a series of elements includes not only those elements, but also other elements not explicitly listed, or elements inherent to such process, method, article or equipment.

Reference numerals used in this disclosure may include: lamp 100; lamp body 10; perforation 11; first shell 12; top plate 121; annular side plate 122; second shell 13; accommodating cavity 14; mating part 15; lead hole 16; connecting part 17; heat dissipation structure 20; blind hole 21; connecting part 22; protrusion 23; first connecting plate 24; second connecting plate 25; cavity 26; positioning part 27; opening 28; light source assembly 30; through hole 31; connecting hole 32; light source plate 33; lamp bead 34; notch 35; light-transmitting cover 40; fasteners 50.

With the increase of a size of the plastic part, an injection molding process thereof will cause a deformation, thus increasing the heat conduction path. Especially, due to the pursuit of cost saving, the plastic part usually is made of a modified PP material and would be seriously deformed after molding, which results in poor heat dissipation rate of the whole lamp. In view of this, it is necessary to improve the lamps to solve the such problems.

Figure 2:
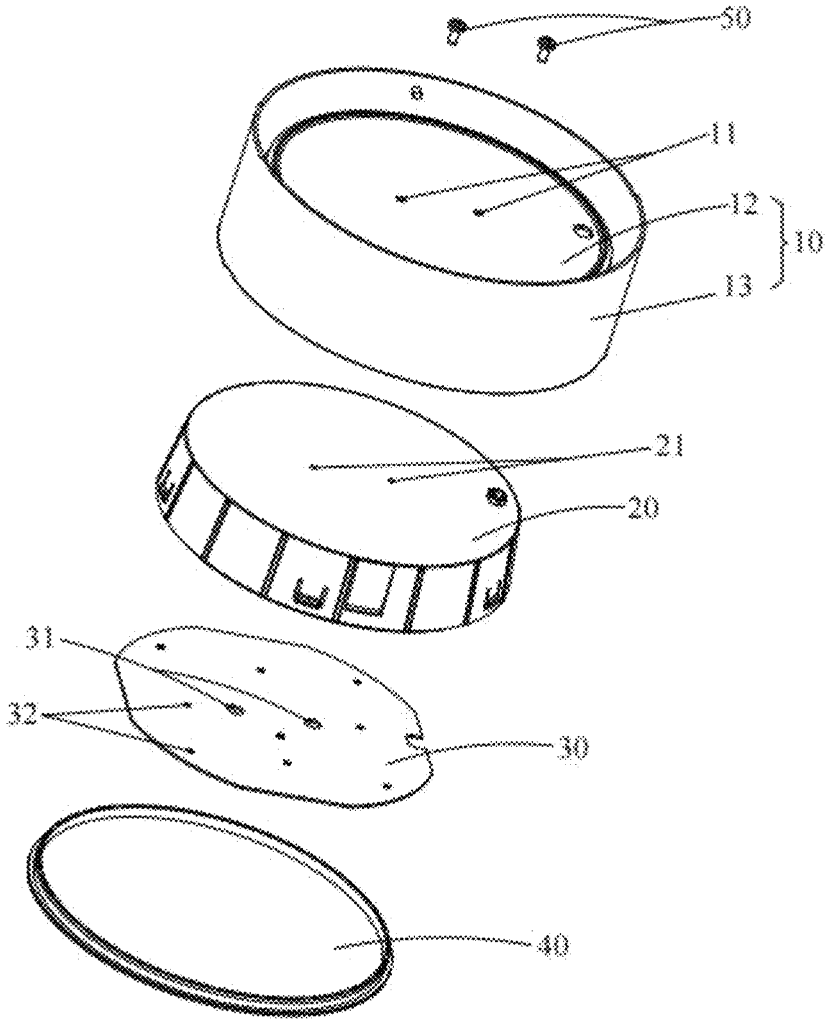
FIG. 2 is an exploded view of FIG. 1.
Figure 6:
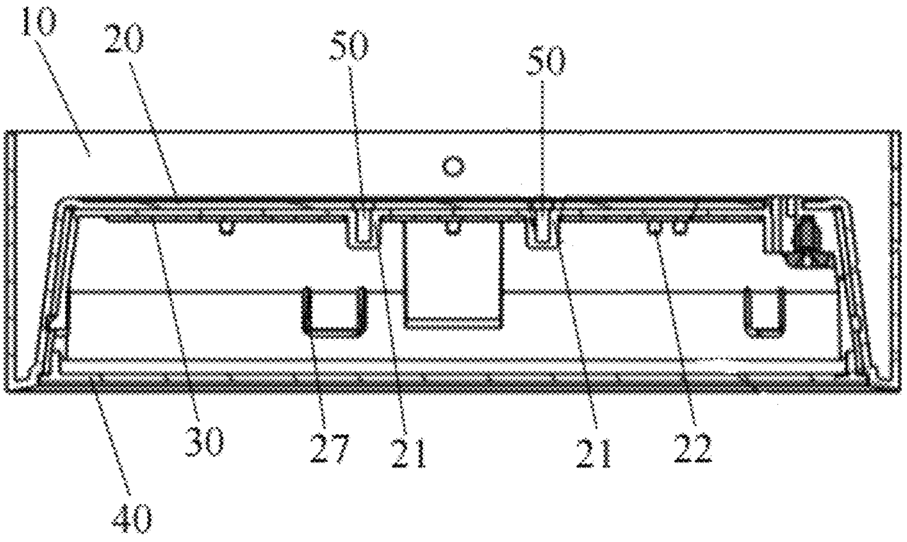
FIG. 6 is a cross-sectional view of the lamp shown in FIG. 1.

As shown in FIG. 1, FIG. 2 and FIG. 6, the present disclosure discloses a lamp 100, which includes a lamp body 10, a heat dissipation structure 20, a light source assembly 30, a light-transmitting cover 40 and a fastener 50 for connecting the lamp body 10 and the heat dissipation structure 20. The light source assembly 30, the heat dissipation structure 20 and the lamp body 10 are assembled in sequence, and the light-transmitting cover 40 is assembled finally. The lamp body 10 is provided with at least one perforation 11; one side of the heat dissipation structure 20 facing towards the lamp body 10 is provided with a blind hole 21 corresponding to the perforation 11; and the fastener 50 passes through the perforation 11 to be connected with the blind hole 21, so as to fixedly connect the lamp body 10 and the heat dissipation structure 20 and to reduce a gap between the heat dissipation structure 20 and the lamp body 10. With this arrangement, it not only ensures a safe creepage distance of the lamp 100 and maintain a physical isolation in existing lamps of the same type as the lamp 100, but also stretches the heat dissipation structure 20 for flattening to avoid a deformation of the heat dissipation structure 20, so as to reduce a connection gap between the heat dissipation structure 20 and each of the lamp body 10 and the light source assembly 30, thereby reducing a heat dissipation path from the light source assembly 30 to the lamp body 10 in the lamp 100.

Figure 3:
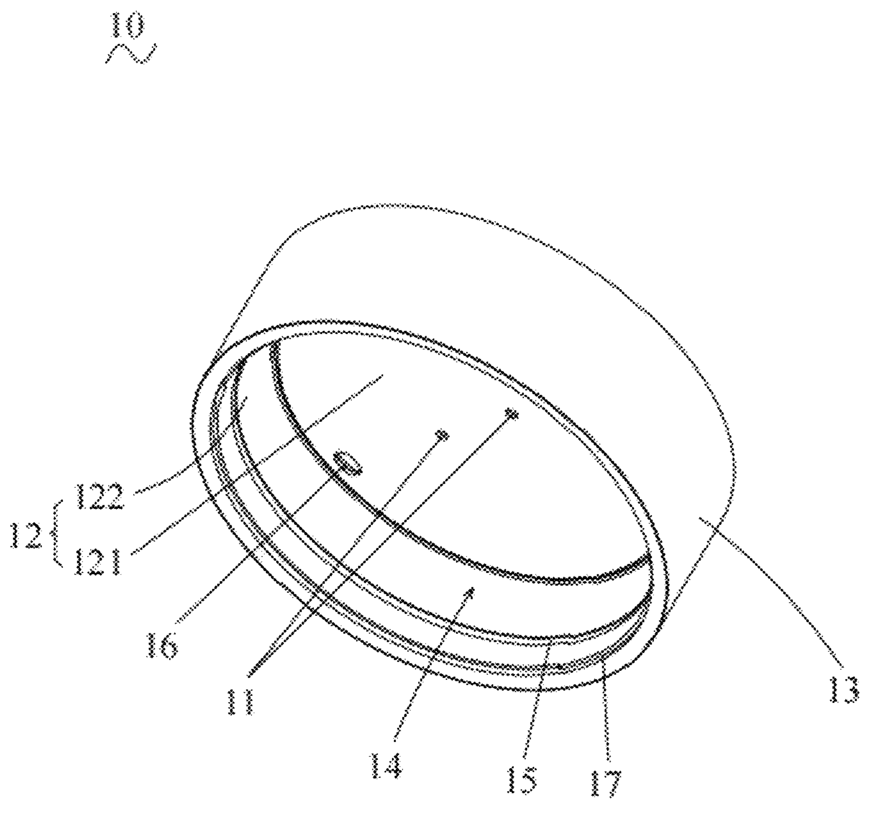
FIG. 3 is a schematic structural diagram of a lamp body in FIG. 2.

Referring to FIG. 2 in combination with FIG. 3, the lamp body 10 includes a first shell 12 and a second shell 13 surrounding an outer side of the first shell 12; a perforation 11 is formed at the top of the first shell 12 and penetrates through the first shell 12. An accommodating cavity 14 is formed inside the first shell 12, and the heat dissipation structure 20 is accommodated in the accommodating cavity 14 and attached to the top of the first shell 12. Specifically, the first shell 12 includes a top plate 121 and an annular side plate 122 connected with a peripheral edge of the top plate 121; one end of the annular side plate 122 away from the top plate 121 extends in a circumferential direction and is connected with the second shell 13. With such arrangement, the lamp body 10 can be formed as a double-shell structure, so that the second shell 13 can be used to shield a connection structure between the lamp body 10 and the heat dissipation structure 20, which enables the whole lamp 100 to be more artistic. In this example, the lamp 100 is a downlight, and both the first shell 12 and the second shell 13 are in a cylindrical shape, but the present disclosure is not limited thereto.

In this example, the perforation 11 is formed in the top plate 121, and the fastener 50 directly passes through the top plate 121 until it is connected with the blind hole 21, so that the lamp body 10 and the heat dissipation structure 20 can be fixedly connected. In addition, the light-transmitting cover 40 is further accommodated in the accommodating cavity 14. Specifically, a connecting part 17 for fixing the light-transmitting cover 40 is arranged at the bottom of the first shell 12, close to a joint between the first shell 12 and the second shell 13. The connecting part 17 is arranged in an annular shape and is arranged on an inner side wall of the first shell 12 to be snap-fitted with the light-transmitting cover 40, so that the light-transmitting cover 40 is fixedly accommodated in the accommodating cavity 14, which can not only ensure a full diffusion of light, but also protect the light-transmitting cover 40 from being damaged. The specific type of the light-transmitting cover 40, as well as the specific assembling mode between the light-transmitting cover 40 and the lamp body 10 are not limited in the present disclosure, and the existing assembling solution can be adopted or adjusted adaptively according to actual situations.

Figure 4:
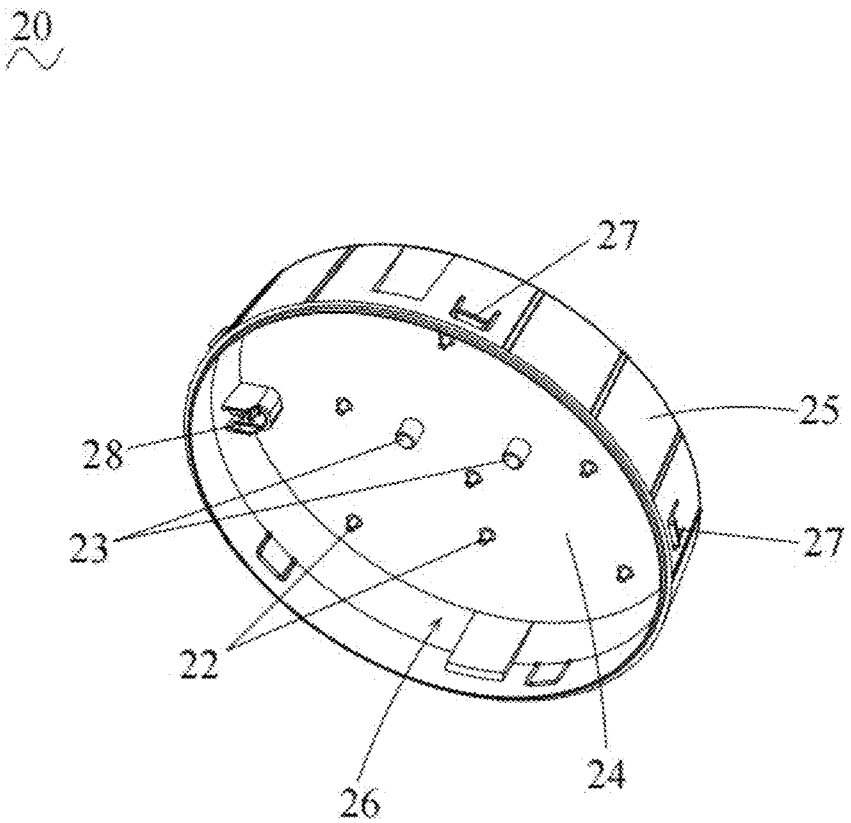
FIG. 4 is a schematic structural diagram of a heat dissipation structure in FIG. 2.
Figure 5:
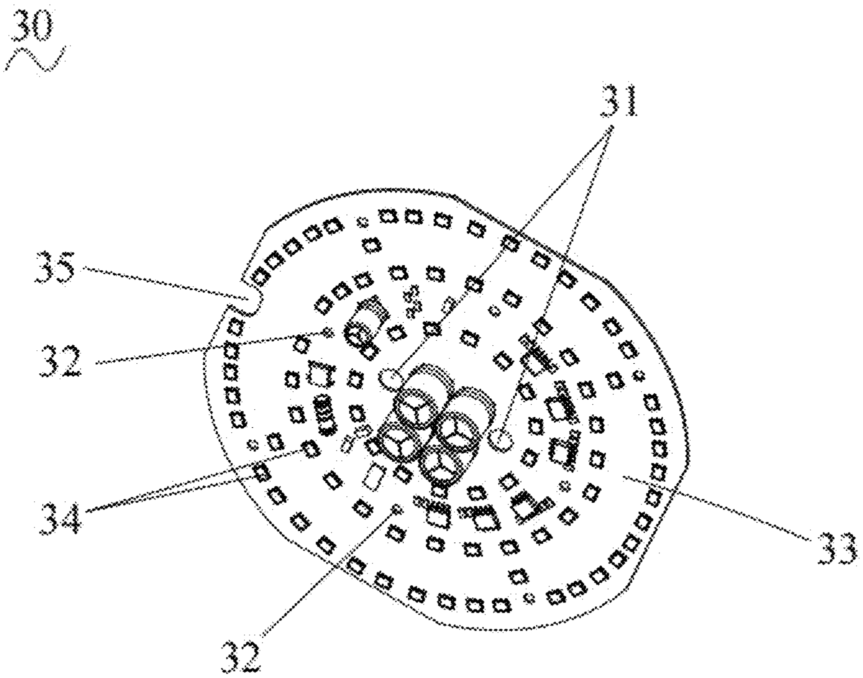
FIG. 5 is a schematic structural diagram of a light source assembly in FIG. 2.

Referring to FIGS. 2, 3 and 4, the heat dissipation structure 20 includes a first connecting plate 24 and a second connecting plate 25 surrounding the first connecting plate 24. The first connecting plate 24 is in a circular shape, and the second connecting plate 25 is in an annular shape, so as to form a cavity 26 for accommodating the light source assembly 30 between the first connecting plate 24 and the second connecting plate 25. The first connecting plate 24 of the heat dissipation structure 20 is attached to the top plate 121 of the first shell 12; and the second connecting plate 25 is attached to the annular side plate 122. Specifically, the blind hole 21 is arranged on the first connecting plate 24; preferably, the first connecting plate 24 is provided with a protrusion 23 protruding towards the light source assembly 30; and the blind hole 21 is arranged in the protrusion 23. Of course, in the case that the first connecting plate 24 is thick enough, the blind hole can be directly formed in the first connecting plate 24 and the protrusion may be not provided, which is not limited in the present disclosure.

In this example, the fastener 50 is preferably a screw, the perforation 11 is preferably a screw hole, and an inner wall surface of the blind hole 21 is also provided with a screw thread correspondingly; in this way, the screw can pass through the screw hole and be locked and fixed in the blind hole 21, so that the heat dissipation structure 20 can be stretched for flattening and the first connecting plate 24 of the heat dissipation structure 20 can be closely attached onto the top plate 121 of the lamp body 10, thereby reducing the gap between the heat dissipation structure 20 and the lamp body 10, and hence shortening the heat conduction path between the heat dissipation structure 20 and the lamp body 10.

The light source assembly 30 is provided with a through hole 31 corresponding to the protrusion 23, and the protrusion 23 is inserted into the through hole 31. Specifically, the light source assembly 30 includes a light source plate 33 and a lamp bead 34 fixed on the light source plate 33. The through hole 31 is arranged on the light source plate 33, and the protrusion 23 is inserted into the through hole 31, which not only can limit the connection between the light source assembly 30 and the heat dissipation structure 20, but also can make the whole lamp 100 thinner and lighter.

The heat dissipation structure 20 is further provided with a connecting part 22 protruding towards the light source assembly 30, and the connecting part 22 is in direct contact with the light source assembly 30, so as to further reduce the connection gap between the light source assembly 30 and the heat dissipation structure 20, that is, the heat dissipation path. Specifically, the connecting part 22 is arranged on the first connecting plate 24, and the light source plate 33 is provided with a connecting hole 32 corresponding to the connecting part 22, and the connecting part 22 is tightly fitted with the connecting hole 32. Preferably, the connecting part 22 passes through the connecting hole 32 to be connected with the light source assembly 30 by hot melting. On the one hand, the light source assembly 30 can be in direct contact with the heat dissipation structure 20, and on the other hand, the light source assembly 30 and the heat dissipation structure 20 can be restricted from moving randomly, so that the connection between the light source assembly 30 and the heat dissipation structure 20 has better stability. Preferably, the connecting part 22 is a limiting post, and the limiting post 22 is connected with the light source assembly 30 by hot melting. Of course, the connection between the connecting part 22 and the light source assembly 30 is not limited to be connected by hot melting, but can also be connected by ultrasonic welding, gluing, etc., as long as the connecting part 22 and the light source assembly 30 can be connected with each other, which is not particularly limited here.

An outer side wall of the second connecting plate 25 is provided with a positioning part 27, and an inner side wall of the first shell 12 is correspondingly provided with a mating part 15. The positioning part 27 and the mating part 15 are fitted with each other so that the heat dissipation structure 20 is accommodated and fixed in the accommodating cavity 14. Preferably, the positioning portion 27 is a hook provided on the second connecting plate 25, and the mating part 15 is a protrusion rib provided on the inner side wall of the first shell 12. In the present disclosure, the heat dissipation structure 20 and the lamp body 10 are preferably in a circular shape. In this case, the mating part 15 is an annular protrusion rib arranged on the inner side wall of the first shell 12, and a plurality of hooks are arranged and evenly distributed on the outer side wall of the second connecting plate 25. Of course, the positioning part 27 and the mating part 15 can also have other structures, as long as the heat dissipation structure 20 can be accommodated and fixed in the accommodating cavity 14, which is not particularly limited here. With the arrangement of the positioning part 27 and the mating part 15, the lamp body 10 and the heat dissipation structure 20 can be fixed in advance, so that they can be fixedly connected again by using the fasteners 50 later.

With combined reference to FIG. 2, FIG. 3, FIG. 4 and FIG. 5, the lamp body 10 is further provided with a lead hole 16 for wiring connection, and the heat dissipation structure 20 is further provided with a columnar-shaped opening 28 corresponding to the lead hole 16. In order to safely connect the wirings with the light source assembly 30, a notch 35 is provided at the edge of the light source plate 33. The wirings sequentially pass through the lead hole 16 and the opening 28, and are pressed into the notch 35, so as to be electrically connected with the light source assembly 30.

In order to clearly explain the structural principle of the lamp 100, the assembling process of the lamp 100 will be described in details below. In the present disclosure, the lamp body 10 is preferably a metal lamp body 10 having thermal conductivity property, and the heat dissipation structure 20 is preferably an insulating plastic part. Firstly, the light source assembly 30 is placed into the cavity 26 of the heat dissipation structure 20; and the protrusion 23 and the connecting part 22 on the heat dissipation structure 20 are inserted into the through hole 31 and the connecting hole 32 on the light source plate 33, respectively; and then the connecting part 22 is fixedly connected with the light source plate 33 by hot melting. Then, the heat dissipation structure 20 assembled with the light source assembly 30 is placed in the accommodating cavity 14 of the lamp body 10, and the positioning part 27 on the heat dissipation structure 20 is fixedly connected with the mating part 15 on the lamp body 10, so that the heat dissipation structure 20 and the lamp body 10 are snap-fitted with each other and positioned. Then, the fastener 50 is inserted through the perforation 11 in the lamp body 10 until it is connected with the blind hole 21, so that the fastener 50 is fixedly locked to lock and fix the heat dissipation structure 20 and the lamp body 10. Finally, the light-transmitting cover 40 and the lamp body 10 are assembled and fixed, and the assembling process of the lamp 100 is completed.

After the light energy generated by the lamp bead 34 on the light source assembly 30 is converted into heat, the heat dissipation path of the whole lamp 100 is as follows: the heat is transmitted from the lamp bead 34 to the light source plate 33, then from the light source plate 33 to the heat dissipation structure 20, then from the heat dissipation structure 20 to the lamp body 10, and finally the lamp body 10 transmits the heat out of the lamp 100. By reducing the gap between the heat dissipation structure 20 and the lamp body 10 and the gap between the heat dissipation structure 20 and the light source plate 33, the heat dissipation efficiency of the whole lamp 100 is improved.

To sum up, in the lamp 100 of the present disclose, the lamp body 10 is provided with a perforation 11 while the heat dissipation structure 20 is provided with a blind hole 21 corresponding to the perforation 11, so that the fastener 50 can pass through the perforation 11 to be connected with the blind hole 21; in this way, the heat dissipation structure 20 can be stretched for flattening, so as to shorten the heat dissipation path between the heat dissipation structure 20 and each of the lamp body 10 and the light source assembly 30, thereby improving the heat dissipation rate of the whole lamp, and prolonging the service life of the lamp 100.

The objective of the present disclosure is to provide a lamp so as to improve the heat dissipation rate of the whole lamp.

In order to achieve the above objective, the present disclosure provides a lamp including a lamp body and a light source assembly arranged in the lamp body, wherein the lamp further includes a heat dissipation structure and a fastener which are located between the lamp body and the light source assembly; the lamp body is provided with at least one perforation, and one side of the heat dissipation structure facing towards the lamp body is provided with a blind hole corresponding to the perforation; the fastener is configured to pass through the perforation to be connected with the blind hole so as to reduce a gap between the heat dissipation structure and the lamp body; one side of the heat dissipation structure facing towards the light source assembly is provided with a connecting part, and the connecting part is connected with the light source assembly to reduce a gap between the light source assembly and the heat dissipation structure.

As a further improvement of the present disclosure, the heat dissipation structure is provided with a protrusion protruding towards the light source assembly, the blind hole is arranged in the protrusion, and the light source assembly is provided with a through hole corresponding to the protrusion, wherein the protrusion is inserted into the through hole to limit a connection between the light source assembly and the heat dissipation structure.

As a further improvement of the present disclosure, the light source assembly is further provided with a connecting hole corresponding to the connecting part, and the connecting part is tightly fitted with the connecting hole.

As a further improvement of the present disclosure, the light source assembly is further provided with a connecting hole corresponding to the connecting part, and the connecting part passes through the connecting hole to be connected with the light source assembly by means of hot melting.

As a further improvement of the present disclosure, the lamp body includes a first shell and a second shell surrounding the first shell; the perforation is formed at a top of the first shell and penetrates through the first shell; an accommodating chamber is formed inside the first shell, and the heat dissipation structure is accommodated in the accommodating chamber and is attached to the top of the first shell.

As a further improvement of the present disclosure, the heat dissipation structure includes a first connecting plate and a second connecting plate surrounding the first connecting plate, and both the connecting part and the blind hole are arranged on the first connecting plate; an outer side wall of the second connecting plate is provided with a positioning part, an inner side wall of the first shell is correspondingly provided with a mating part, and the positioning part and the mating part are fitted with each other so that the heat dissipation structure is accommodated and fixed in the accommodating cavity.

As a further improvement of the present disclosure, the first shell includes a top plate and an annular side plate connected with an edge of a periphery of the top plate; one end of the annular side plate away from the top plate is connected with the second shell, the perforation is arranged on the top plate, the first connecting plate of the heat dissipation structure is attached to the top plate, and the second connecting plate of the heat dissipation structure is attached to the annular side plate.

As a further improvement of the present disclosure, the positioning part is a hook arranged on the second connecting plate, and the mating part is a protrusion rib arranged on the inner side wall of the first shell.

As a further improvement of the present disclosure, the heat dissipation structure and the lamp body are both in a circular shape, the mating part is an annular protrusion rib arranged on the inner side wall of the first shell, and a plurality of hooks are arranged and evenly distributed on the outer side wall of the second connecting plate.

As a further improvement of the present disclosure, the fastener is a screw, the perforation is a screw hole, the heat dissipation structure is an insulating plastic part, and the lamp body is a metal lamp body.

The present disclosure achieves the following beneficial effects: in the present disclose, the lamp body is provided with a perforation while the heat dissipation structure is provided with a blind hole corresponding to the perforation, so that the fastener can pass through the perforation to be connected with the blind hole; in this way, the heat dissipation structure can be stretched for flattening, and meanwhile the heat dissipation path between the heat dissipation structure and each of the lamp body and the light source assembly can be shortened, thereby improving the heat dissipation rate of the whole lamp.

The above examples are only used to illustrate the technical solution of the present disclosure, but are not intended to limit the present disclosure. Although the present disclosure has been described in details with reference to the examples, it should be understood by those ordinary skilled in the art that the technical solution of the present disclosure can be modified or replaced by equivalents without departing from the spirit and scope of the technical solution of the present disclosure.

The invention claimed is:

1. A lamp, comprising a lamp body and a light source assembly arranged in the lamp body, wherein:

the lamp further comprises a heat dissipation structure as well as a fastener located between the lamp body and the light source assembly;

the lamp body is provided with at least one perforation, and one side of the heat dissipation structure facing towards the lamp body is provided with a blind hole corresponding to the perforation;

the fastener is configured to pass through the perforation to be connected with the blind hole so as to reduce a gap between the heat dissipation structure and the lamp body; and a connecting part is arranged on one side of the heat dissipation structure facing towards the light source assembly, and the connecting part is connected with the light source assembly to reduce a gap between the light source assembly and the heat dissipation structure.

2. The lamp according to claim 1, wherein the heat dissipation structure is provided with a protrusion protruding towards the light source assembly, the blind hole is arranged in the protrusion, and the light source assembly is provided with a through hole corresponding to the protrusion, wherein the protrusion is inserted into the through hole to limit a connection between the light source assembly and the heat dissipation structure.

3. The lamp according to claim 1, wherein the light source assembly is further provided with a connecting hole corresponding to the connecting part, and the connecting part is tightly fitted with the connecting hole.

4. The lamp according to claim 1, wherein the light source assembly is further provided with a connecting hole corresponding to the connecting part, and the connecting part passes through the connecting hole to be connected with the light source assembly by means of hot melting.

5. The lamp according to claim 1, wherein the lamp body comprises a first shell and a second shell surrounding an outer side of the first shell; the perforation is formed at a top of the first shell and penetrates through the first shell; an accommodating chamber is formed inside the first shell, and the heat dissipation structure is accommodated in the accommodating chamber and is attached to the top of the first shell.

6. The lamp according to claim 5, wherein the heat dissipation structure comprises a first connecting plate and a second connecting plate surrounding the first connecting plate, and both the connecting part and the blind hole are arranged on the first connecting plate; an outer side wall of the second connecting plate is provided with a positioning part, an inner side wall of the first shell is correspondingly provided with a mating part, and the positioning part and the mating part are fitted with each other so that the heat dissipation structure is accommodated and fixed in the accommodating cavity.

7. The lamp according to claim 6, wherein the first shell comprises a top plate and an annular side plate connected with a peripheral edge of the top plate; one end of the annular side plate away from the top plate is connected with the second shell, the perforation is arranged on the top plate, the first connecting plate of the heat dissipation structure is attached to the top plate, and the second connecting plate of the heat dissipation structure is attached to the annular side plate.

8. The lamp according to claim 6, wherein the positioning part is a hook arranged on the second connecting plate, and the mating part is a protrusion rib arranged on the inner side wall of the first shell.

9. The lamp according to claim 8, wherein the heat dissipation structure and the lamp body are both in a circular shape, the mating part is an annular protrusion rib arranged on the inner side wall of the first shell, and a plurality of hooks are arranged and evenly distributed on the outer side wall of the second connecting plate.

10. The lamp according to claim 1, wherein the fastener is a screw, the perforation is a screw hole, the heat dissipation structure is an insulating plastic part, and the lamp body is a metal lamp body.

* * * * *